(No Model.)
V. H. ROTHSCHILD.
COLLAR OR CUFF.
No. 341,606. Patented May 11, 1886.
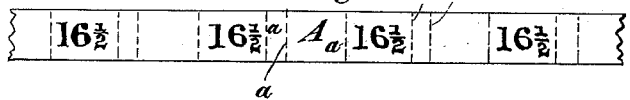
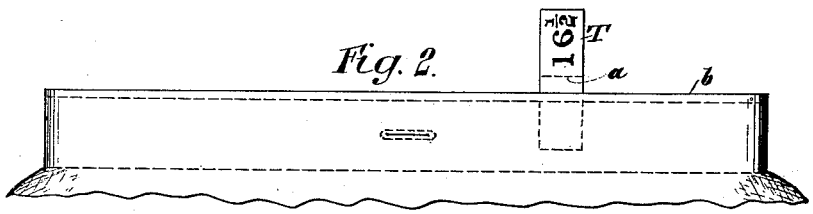
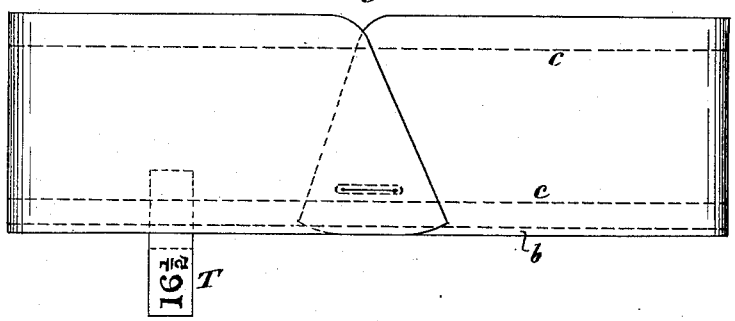
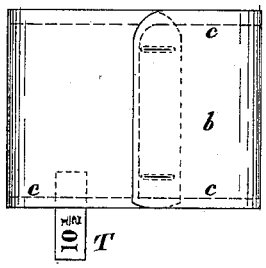
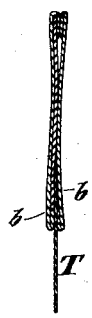
Witnesses
Wm G. Lifney
M. Fowler
Inventor
V. Henry Rothschild
by his attorneys
Gifford & Brown

UNITED STATES PATENT OFFICE.

V. HENRY ROTHSCHILD, OF NEW YORK, N. Y.

COLLAR OR CUFF.

SPECIFICATION forming part of Letters Patent No. 341,606, dated May 11, 1886.

Application filed October 5, 1885. Serial No. 179,004. (No model.)

*To all whom it may concern:*

Be it known that I, V. HENRY ROTHSCHILD, of New York, in the county and State of New York, have invented a certain new and useful Improvement in Marking Shirts, Shirt-Collars, and Shirt-Cuffs, of which the following is a specification.

It is customary to mark upon neckbands of shirts and upon collars and cuffs the sizes to which they are made. These markings are quite important to the dealers in these articles, because they obviate the necessity for measuring the articles in selling them. Great difficulty has been experienced in marking the articles when they are made of dark-colored materials. No ink which is conspicuous and which will stand the laundering process has been obtainable for use on the dark-colored materials.

It is the object of my improvement to provide a means for legibly and durably marking the articles when made of dark-colored materials.

My improvement involves the weaving or otherwise delineating a series of each of the size-numbers upon a strip of white woven material and the stopping off of the weave of the material close to each of the size-numbers, so that a size-number may be cut off the strip without being liable to unravel. The material containing a size-number is inserted between the component plies or thicknesses of the material in the article to be marked, and is secured thereby the stitching whereby the component parts are fastened together.

In the accompanying drawings, Figure 1 is a face view of a strip having a series of size-numbers delineated upon it. Fig. 2 is a view of a shirt-neckband having a part of such a strip as is shown in Fig. 1 attached to it. Fig. 3 is a view of a collar similarly marked. Fig. 4 is a view of a cuff marked in the same way. Fig. 5 is a transverse section of an article marked according to my improvement.

Similar letters of reference designate corresponding parts in all the figures.

The strip A shown in Fig. 1 is made of woven material, and will be white or approximately white. On it are delineated, in a conspicuous color and by weaving or other suitable means, a series of size-numbers. Between the size-numbers the weave of the strip is stopped off in any suitable way—as, for instance, by means of parallel bars *a*, woven or stitched into the strip. The strip may consequently be cut between the size-numbers without unraveling.

Each of the articles to be marked, which I have shown in Figs. 2, 3, 4, and 5, is composed of two or more plies or thicknesses, *b*, that are united by stitching *c*.

During the operation of uniting the component plies or thicknesses of the articles the operator inserts one end of a strip such as I have shown in Fig. 1 between the plies or thicknesses. It is then secured by the stitching that unites the plies or thicknesses. The strip A is then cut off close to the size-number, just beyond a point where the weave of the strip is stopped off, and the part left projects in the form of a bag, T, bearing a size-number. The size-number with which the article is thus provided is not only legible, but is conspicuous. It will, moreover, stand the laundering process. This is not only an effective way, but it is also a very cheap way, of marking the articles. Its effectiveness is of the greatest importance, as it will enable dealers to avoid mistakes that have always occurred through mismatching collars and shirts made of dark-colored materials, owing to their inability to read the size-numbers.

The purchasers of the articles can cut off the tags, if they choose, as the tags are useful merely to the dealer in the articles under ordinary circumstances.

What I claim as my invention, and desire to secure by Letters Patent, is—

A shirt neckband, collar, or cuff having a strip bearing a size-number, which strip is stopped off upon each end close up to the size-number and inserted between the component plies or thicknesses of the material composing the shirt neckband, collar, or cuff, and secured by the stitching which unites such plies or thicknesses of material, substantially as specified.

V. HENRY ROTHSCHILD.

Witnesses:
 ALBERT ARONSON,
 ISAAC DREYFUS.